(12) United States Patent
Kubitza et al.

(10) Patent No.: US 10,994,650 B2
(45) Date of Patent: May 4, 2021

(54) PROCEDURE FOR ACTUATING AT LEAST ONE LIGHT MODULE OF A LIGHT UNIT, LIGHT UNIT, COMPUTER PROGRAM PRODUCT AND MACHINE-READABLE MEDIUM

(71) Applicant: Hella GmbH & Co. KGaA, Lippstadt (DE)

(72) Inventors: Boris Kubitza, Möhnesee-Körbecke (DE); Udo Venker, Güterlsoh (DE); Carsten Wilks, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/640,886

(22) PCT Filed: Aug. 7, 2018

(86) PCT No.: PCT/EP2018/071314
§ 371 (c)(1),
(2) Date: Feb. 21, 2020

(87) PCT Pub. No.: WO2019/038074
PCT Pub. Date: Feb. 28, 2019

(65) Prior Publication Data
US 2020/0353861 A1 Nov. 12, 2020

(30) Foreign Application Priority Data
Aug. 24, 2017 (DE) ..................... 10 2017 119 402.9

(51) Int. Cl.
*B60Q 1/06* (2006.01)
*B60Q 1/14* (2006.01)
(Continued)

(52) U.S. Cl.
CPC ............ *B60Q 1/143* (2013.01); *F21S 41/153* (2018.01); *F21S 41/657* (2018.01); *B60Q 2300/122* (2013.01); *F21Y 2115/10* (2016.08)

(58) Field of Classification Search
CPC . B60Q 1/143; B60Q 2300/122; F21S 41/153; F21S 41/657; F21Y 2115/10
(Continued)

(56) References Cited

U.S. PATENT DOCUMENTS 7,429,918 B2 * 9/2008 Watanabe .............. B60Q 1/085
340/468
8,310,662 B2 11/2012 Mehr et al.
(Continued)

FOREIGN PATENT DOCUMENTS

IE 102004052434 A1 5/2006
IE 102014212162 A1 12/2014

*Primary Examiner* — Ali Alavi
(74) *Attorney, Agent, or Firm* — Husch Blackwell LLP

(57) ABSTRACT

A procedure is provided for actuating at least one light module of a light unit of a vehicle, with at least one status recognition device for identifying a vehicle status and/or at least one surroundings recognition device for identifying a vehicle's surroundings, and with a light control system. The light module is automatically actuated by the status recognition device and/or the surroundings recognition device by means of the light control system depending on at least one input signal of the light control system. In order to improve a light distribution adapted to the respective driving situation, the light unit features a light distribution recognition device for identifying a light distribution of a light beam emitted by the light module into the surroundings of the vehicle and that the light module be automatically actuated by means of the light control system depending on at least one input signal of the light control system from the light distribution recognition device. Furthermore, the invention
(Continued)

relates to a light unit for a vehicle, a computer program product and a machine-readable medium.

9 Claims, 2 Drawing Sheets

(51) Int. Cl.
  *F21S 41/153* (2018.01)
  *F21S 41/657* (2018.01)
  *F21Y 115/10* (2016.01)
(58) Field of Classification Search
  USPC .......................................................... 362/466
  See application file for complete search history.

(56) References Cited

U.S. PATENT DOCUMENTS

2004/0218401 A1\* 11/2004 Okubo ..................... B60Q 1/10
  362/526
2008/0084165 A1    4/2008 Otsuka et al.
2013/0257274 A1\* 10/2013 Sekiguchi .............. B60Q 1/143
  315/82

\* cited by examiner

PROCEDURE FOR ACTUATING AT LEAST ONE LIGHT MODULE OF A LIGHT UNIT, LIGHT UNIT, COMPUTER PROGRAM PRODUCT AND MACHINE-READABLE MEDIUM

CROSS REFERENCE

This application claims priority to PCT Application No. PCT/EP2018/071314, filed 7 Aug. 2018, which itself claims priority to German Application No. 10 2017 119402.9, filed 24 Aug. 2017, the entirety of both of which are hereby incorporated by reference.

FIELD OF THE INVENTION

The present invention relates to a procedure for actuating at least one light module of a light unit of a vehicle in accordance with the preamble of claim 1, a light unit for a vehicle in accordance with the preamble of claim 6, a computer program product and a machine-readable medium.

BACKGROUND

Procedures for actuating at least one light module of a light unit of a vehicle, light units for a vehicle, computer program products and machine-readable media are already known from the previous art in numerous embodiments.

For example, a light unit of a vehicle is known comprising two main headlamps, each with one light module, a surroundings recognition device for identifying the vehicle's surroundings and a light control system, where the light modules of the two main headlamps are automatically actuated by the surroundings recognition device by means of the light control system depending on at least one input signal of the light control system.

This is where the present invention comes in.

SUMMARY OF THE INVENTION

The present invention is based on the task of improving a light distribution adjusted to the respective driving situation.

This task is solved by a procedure for actuating at least one light module of a light unit of a vehicle with the features of claim 1, a light unit for a vehicle with the features of claim 6, a computer program product with the features of claim 9 and a machine-readable medium with the features of claim 10. The dependent claims relate to advantageous refinements of the invention.

One material advantage of the invention is that the light distribution generated is better adaptable to the respective driving situation. By means of a status recognition devices for identifying a vehicle status, such as steering-angle sensors or the like, and/or surroundings recognition devices for identifying the vehicle's surroundings, such as a front camera or the like, it is possible nowadays to set a light beam emitted by at least one light module of a light unit of the vehicle into the surroundings in front of the vehicle depending on an identified vehicle status and/or the identified surroundings of the vehicle. The invention permits an improvement in the adjustment of the light distribution of a light beam emitted into the vehicle's surroundings by including the current light distribution of the light beam in how the light control system actuates the light module.

The term 'light distribution' is to be interpreted very broadly and can comprise, for example, a spatial alignment of a light beam and/or a spatial expansion of a light beam and/or a light color distribution of a light beam.

One advantageous refinement of the procedure in accordance with the invention is, however, that the light distribution of the light beam takes the form of an illuminance distribution of the light beam and the light module is controlled by means of the light control system depending on the illuminance distribution of the light beam captured by means of the light distribution recognition device. This means that an essential parameter with regard to the statutory regulations on light distribution is also included in how the light module is actuated by means of the light control system.

Another advantageous refinement of the procedure in accordance with the invention is that, within the light control system, the light distribution of the light beam captured by means of the light distribution recognition system is compared with at least one legal light distribution corresponding to the light beam stored in a memory of the light control system and the light module is actuated by means of the light control system depending on the comparison. By doing so, the light distribution of the light beam emitted by the at least one light module of the light unit into the vehicle's surroundings is firstly adjusted to the respective driving situation. Secondly, it is ensured that the created light distribution of the light beam corresponds to the statutory regulations for such light distribution arrangements.

There are mandatory legal regulations for light distribution arrangements that must be complied with in order to obtain approval for the vehicle. It is usual practice for light distribution arrangements, and therefore beams of light emitted into a vehicle's surroundings by at least one light module of a vehicle's light unit to be arranged on the basis of these legal regulations. On the other hand, modern vehicles provide options to calibrate the light distribution of a light beam to the vehicle's current driving situation, basically in real time i.e. while the vehicle is in operation. The invention makes it possible to both comply with legal requirements and to optimize the light distribution of a light beam to the current driving situation. for example with regard to illumination of the vehicle's surroundings that provides benefits to the driver of a vehicle.

One advantageous refinement of the aforementioned embodiment referring back to claim 2, provides for a situation where the illuminance in one light beam area of the light beam emitted by the light module is reduced at least to a legally permissible illuminance if the illuminance captured by means of the light distribution recognition device is higher in this light beam area than the legally permissible luminance for this light beam area. This ensures that the legal requirements for the light distribution, namely the illuminances, are complied with in every light beam area of the vehicle's environment illuminated with the light unit, i.e. the illuminated surroundings of the vehicle.

One advantageous refinement of the last two embodiments referred to above provides for a situation where depending on at least one of the input signals of the light control system from the status recognition device and/or the surroundings recognition device, a legal light distribution is selected from a plurality of stored legal light distributions corresponding to the light beam for comparison of the light distribution of the light beam captured by means of the light distribution recognition device. In this way, it is possible to take into consideration differing legal regulations, such as those for Europe and those for the USA, already in the vehicle's state as delivered. Configuration at a later date is no longer necessary. This is especially advantageous if a driver travels in one and the same vehicle between countries with different regulations on light distribution. It is sufficient as a example to mention countries with left-hand traffic and right-hand traffic.

In principle, the light unit and the at least one light module of the light unit can be chosen at will with regard to the type, dimensions, manner of functioning and arrangement within wide suitable limits. For example, the light unit can take the form of a rear light or a side light.

One advantageous refinement of the light unit in accordance with the invention provides for a situation where the light module takes the form of a light module for a headlamp of the vehicle. The headlamp can, for example, take the form of a reversing light. Headlamps are usually intended for illumination tasks i.e. for illuminating the vehicle's environment, i.e. the surroundings of the vehicle. The illuminance of headlamps is correspondingly high, for example. This means that the light unit in accordance with the invention can be used advantageously specifically in headlamps.

An especially advantageous refinement of the aforementioned embodiment provides for a situation where the headlamp takes the form of a main headlamp of the vehicle and the surroundings recognition device for identifying the surroundings in front of the vehicle in the direction of travel of the vehicle. In this way, it is firstly possible to actuate the at least one light module depending on the surroundings in front of the vehicle. Secondly, the main headlamps are of special importance for driving safety.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
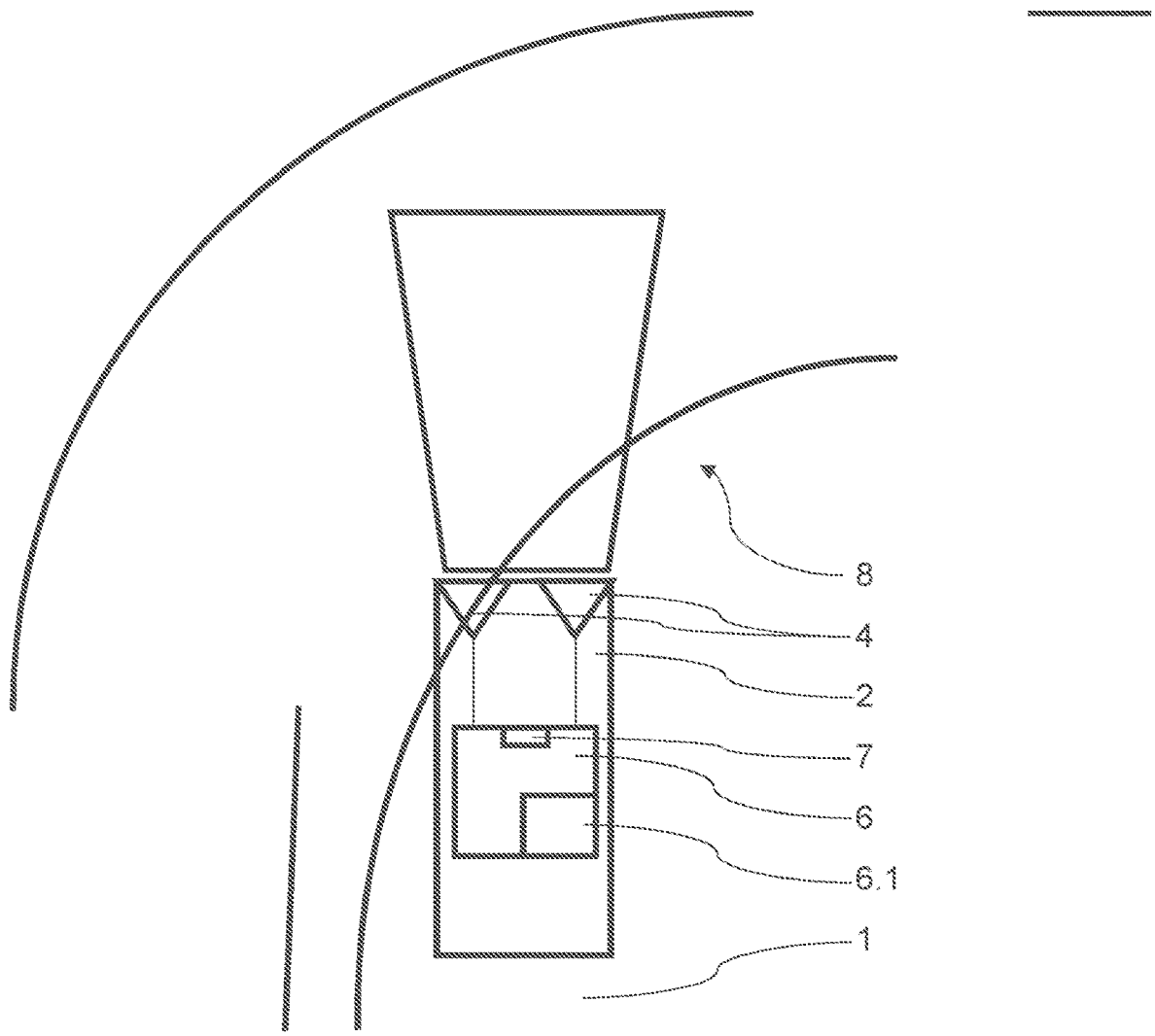
FIG. 1 is a sample embodiment of a light unit of a vehicle in accordance with the invention, shown in part.

FIG. 1 shows, in part, a sample embodiment of a light unit in accordance with the invention. A vehicle 2 in the form of a motor vehicle is driving along a road 1; the vehicle features two headlamps 4 in the form of main headlamps and a light control system 6 of a light unit of the vehicle 2. The main headlamps 4 each feature a light module (not shown). Each light module comprises an LED matrix with a plurality of LEDs arranged in rows and columns that can be individually actuated by the light control system 6.

Furthermore, the light unit of the motor vehicle 2 features a surroundings recognition device 7 in the form of a front camera for identifying the surroundings in front of the motor vehicle 2. A light beam 8 can be emitted into the surroundings in front of the motor vehicle 2 by means of the main headlamps 4. Firstly, the surroundings in front of the motor vehicle 2 can be captured by the front camera 7. Secondly, the front camera 7 simultaneously takes the form of a light distribution recognition device for identifying the light distribution of the light beam 8 in the surroundings in front of the motor vehicle 2. In the present sample embodiment, the front camera 7 is designed for identifying the illuminance distribution of the light beam 8 in the surroundings in front of the motor vehicle 2. Here, this means that the light distribution of the light beam 8 corresponds to the illuminance distribution of the light beam 8.

Below, the procedure in accordance with the invention is explained in more detail on the basis of FIGS. 1 and 2.

The motor vehicle 2 is driving along the road 1, as shown in FIG. 1. In doing so, the front camera 7 captures the surroundings in front of the motor vehicle 2. By means of a signal transmission connection (not shown), corresponding output signals of the front camera 7 are relayed to the light control system 6. The output signals of the front camera 7 arrive at the light control system 6 as input signals. Depending on these input signals, the light control system 6 actuates the light modules of the main headlamps 4 of the motor vehicle 2 in such a way that the surroundings in front of the motor vehicle 2 are illuminated in the best possible manner, namely adapted to the current driving situation by means of the main headlamps 4, i.e. by means of the light beam 8.

Such illumination is potentially not in compliance with legal requirements in place. Consequently, it is intended with the present embodiment in accordance with the invention for the front camera 7 to not only capture the surroundings in front of the motor vehicle 2 but also the light distribution, namely the illuminance distribution, of the light beam 8 emitted by the two main headlamps 4 into the surroundings in front of the motor vehicle 2 and to transmit the same to the light control system 6. In the light control system 6, the current illuminance distribution in the light beam 8 is compared with legal regulations stored in a memory 6.1 of the light control system 6 and corresponding to light beam 8, namely the highest legally permissible illuminances for individual light beam areas of light beam 8 of the main headlamps 4 in the surroundings in front of the motor vehicle 2.

If the illuminances in all light beam areas of the light beam 8 of the main headlamps 4 are not higher than the highest legally permissible illuminances for these light beam areas, the illuminance distribution in the light beam 8 is not altered. Should the illuminance in one of the light beam areas of the light beam 8 of the main headlamps 4, however, be higher than the highest legally permissible illuminance, the light modules of the two main headlamps 4 are actuated by means of the light control system 6 in such a way that the illuminance in this light beam area of the light beam 8 of the main headlamps 4 is reduced to the highest legally permissible illuminance.

Figure 2:
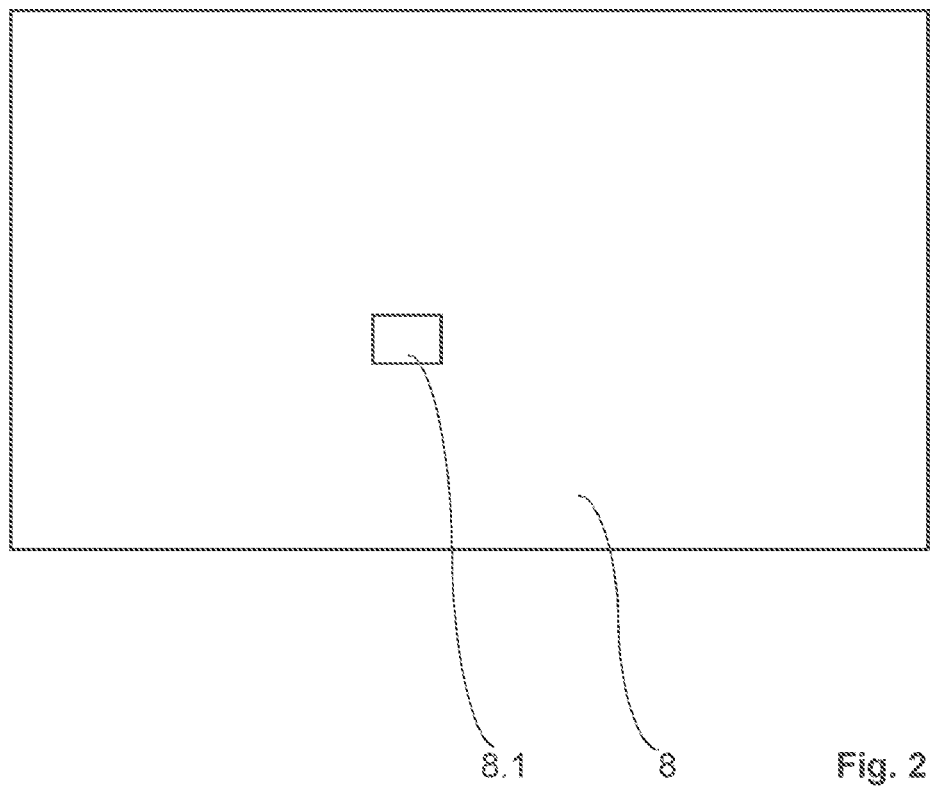
FIG. 2 illustrates surroundings in front of the vehicle illuminated by the light unit of the sample embodiment from the perspective of the driver of the vehicle.

This is shown as an example in FIG. 2. FIG. 2 shows the surroundings in front of the motor vehicle 2 illuminated by means of the main headlamps 4, i.e. the light beam 8, from the perspective of a driver of motor vehicle 2. The illuminance distribution of the light beam 8 emitted by the two main headlamps 4 into the surroundings in front of the motor vehicle 2 is in compliance with the highest legally permissible illuminances apart from one light beam area. Only on the light beam area in light beam 8 symbolically shown as a rectangle 8.1 is the illuminance higher than the highest legally permissible illuminance in relation to the light beam area 8.1. For this reason, the illuminance for the light beam area 8.1 of the light beam 8 is reduced in the manner described above in such a way that the illuminance for the light beam area 8.1 is not higher than the highest legally permissible luminance in relation to the light beam area 8.1.

The light beam 8 emitted by the light modules of the main headlamps 4 into the surroundings in front of the motor vehicle 2 is equal to the entirety of such light beam areas of the light beam 8. In this respect, the light beam areas do not necessarily have to take the identical form. Depending on the application, the light beam areas can be chosen at will within wide suitable limits with regard to nature, dimensions, arrangement and shape. For example, the light beam areas of the light beam may feature dimensions that differ from each other. If merely small (in terms of dimensions) light beam areas require adjustments in light distribution, for instance of illuminance, need to be adjusted on account of legal requirements, the overall appearance does not significantly change for the driver of the vehicle. Correspondingly, illumination of the surroundings in front of the vehicle that is advantageous for the driver of the vehicle is feasible, for example, while complying with legal requirements at the same time.

The invention is not limited to the present sample embodiment. For example, other light units, light modules and surroundings recognition devices as well as status recognition devices known to the specialist are conceivable. Instead of using a surroundings recognition device, for example a front camera, it is also possible to use a status recognition device to identify a vehicle status, for example a steering-angle sensor, for establishing that the vehicle is negotiating a curve. It is also feasible for the light control system to actuate the at least one light module of the light unit depending on a combination of surroundings recognition device and status recognition device.

The light distribution recognition device does not necessarily have to be identical to the status recognition device and/or the surroundings recognition device. It would also be conceivable for the light unit to feature a separate light distribution recognition unit. The light distribution recognizable by means of the light distribution recognition device does not necessarily have to be the illuminance distribution. The term 'light distribution' is to be interpreted very broadly and comprises, alongside illuminance distribution of a light beam, as an alternative or in addition, for example, a spatial alignment of a light beam and/or a spatial expansion of a light beam and/or a light color distribution of a light beam.

The memory could be designed in such a way that the legal regulations on the light distribution stored in the memory of the light control system can furthermore be configured or modified after delivery of the vehicle. In the case of vehicles intended for exportation, as an example, it may be planned for datasets complying with the legal regulations in the importing country to be copied into the memory, for instance at a vehicle dealership in the importing country.

In order to render the invention to the greatest extent universally usable, it is possible to provide for a situation where, depending on at least one of the input signals of the light control system from the status recognition device and/or the surroundings recognition device, a legal light distribution is selected from a plurality of stored legal light distributions corresponding to the light beam for a comparison of the light distribution of the light beam captured by means of the light distribution recognition device. For example, the light control system can recognize, depending on output signals of a surroundings recognition device designed as a navigation system, the country in which the vehicle is traveling and correspondingly select the legal regulations applicable for this country for comparison with the light distribution captured by means of the light distribution recognition device.

The inventive idea also extends to computer program products comprising commands that cause a light unit in accordance with the invention, for example in accordance with the present sample embodiment, to execute the steps of the procedure in accordance with the invention, for example in accordance with the present embodiment, as well as machine-readable media on which such a computer program product is stored.

LIST OF REFERENCE SYMBOLS

1 Road
2 Vehicle in the form of a motor vehicle
4 Main headlamp of the motor vehicle 2
6 Light control system
6.1 Memory of the light control system 6
7 Surroundings recognition device, at the same time in the form of a light distribution recognition device
8 Light beam
8.1 Light beam area of light beam 8 with too high an illuminance

The invention claimed is:

1. A method of actuating at least one light module of a light unit of a vehicle, the vehicle having at least one of at least one status recognition device for identifying a vehicle status and at least one surroundings recognition device for identifying a vehicle's surroundings, the vehicle further including a light control system, the method comprising the steps of:
automatically actuating the light module by at least one of the status recognition device and the surroundings recognition device by means of the light control system depending on at least one input signal of the light control system;
capturing a light distribution of a light beam, by a light distribution recognition device of the light unit, emitted by the light module into the surroundings of the vehicle;
identifying the light distribution of a light beam, by a light distribution recognition device;
comparing the light distribution of the light beam captured by the light distribution recognition device with at least one legal light distribution stored in a memory of the light control system and corresponding to the light beam; and
automatically actuating the light module by means of the light control system depending on the comparison.

2. The method in accordance with claim 1, wherein the light distribution of the light beam takes the form of an illuminance distribution of the light beam and the light module is actuated by means of the light control system depending on illuminance distribution of the light beam captured by the light distribution recognition device.

3. The method in accordance with claim 1, wherein the at least one legal light distribution corresponds to a legally permissible illuminance.

4. The method in accordance with claim 1 the illuminance is reduced in one light beam area of the light beam emitted by the light module is reduced at least to a legally permissible illuminance if the illuminance captured by means of the light distribution recognition device is higher in this light beam area than the legally permissible luminance for this light beam area.

5. The method in accordance with claim 1 wherein depending on at least one of the input signals of the light control system from the status recognition device and/or the surroundings recognition device, a legal light distribution is selected from a plurality of stored legal light distributions corresponding to the light beam for a comparison of the light distribution of the light beam captured by means of the light distribution recognition device.

6. A light unit for a vehicle for performing the procedure in accordance with claim 1, the light unit comprising:
- at least one of at least one status recognition device for identifying a vehicle status and at least one surroundings recognition device for identifying a vehicle's surroundings;
- a light control system, where the light module can be automatically controlled by the status recognition device and/or the surroundings recognition device by means of the light control system depending on at least one input signal of the light control system,
- wherein the light unit features a light distribution recognition device for identifying a light distribution of a light beam emitted by the light module into the surroundings of the vehicle and the light module can be automatically actuated by the light distribution recognition device by means of the light control system depending on at least one input signal of the light control system.

7. The light unit in accordance with claim 6, wherein the light module takes the form of a light module for a headlamp of the vehicle.

8. The light unit in accordance with claim 7, wherein the headlamp takes the form of a main headlamp of the vehicle and the surroundings recognition device for identifying the surroundings in front of the vehicle in the direction of travel of the vehicle.

9. A computer program product stored on a computer-readable medium, that when executed performs the steps of claim 1.

* * * * *